US012693106B2

(12) United States Patent
Fendler

(10) Patent No.: US 12,693,106 B2
(45) Date of Patent: Jul. 28, 2026

(54) INORGANIC STRAIN GAUGE

(71) Applicant: COMMISSARIAT A L'ENERGIE ATOMIQUE ET AUX ENERGIES ALTERNATIVES, Paris (FR)

(72) Inventor: Manuel Fendler, Grenoble cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 495 days.

(21) Appl. No.: 18/252,948

(22) PCT Filed: Nov. 16, 2021

(86) PCT No.: PCT/EP2021/081780
§ 371 (c)(1),
(2) Date: May 15, 2023

(87) PCT Pub. No.: WO2022/101494
PCT Pub. Date: May 19, 2022

(65) Prior Publication Data
US 2024/0011758 A1     Jan. 11, 2024

(30) Foreign Application Priority Data

Nov. 16, 2020    (FR) ...................................... 2011737

(51) Int. Cl.
*G01B 7/16*        (2006.01)
*G01B 11/16*       (2006.01)
*G01L 1/22*        (2006.01)
(52) U.S. Cl.
CPC ................ *G01B 7/18* (2013.01); *G01B 11/16* (2013.01); *G01L 1/2287* (2013.01)

(58) Field of Classification Search
CPC .......... G01B 7/18; G01B 11/16; G01L 1/2287
See application file for complete search history.

(56) References Cited

U.S. PATENT DOCUMENTS

| 4,104,605 A | * | 8/1978 | Boudreaux | .............. G01B 7/18 |
| | | | | 427/124 |
| 4,115,174 A | * | 9/1978 | Bauer | ...................... G01B 7/18 |
| | | | | 156/704 |

(Continued)

FOREIGN PATENT DOCUMENTS

| EP | 1 990 633 A2 | 11/2008 | |
| FR | 2 942 874 A1 | 9/2010 | |
| JP | 6267203 | * 1/2018 | .......... B25J 15/0616 |

OTHER PUBLICATIONS

JP-6267203 translation (Year: 2018).*

(Continued)

*Primary Examiner* — Kyung S Lee
(74) *Attorney, Agent, or Firm* — Oblon, McClelland, Maier & Neustadt, L.L.P.

(57)          ABSTRACT

A device for measuring a deformation, the device including a deformable body and a strain gauge, the strain gauge including a support in contact with the deformable body and a metallic resistive member in contact with the support, the resistive member having a resistance that varies with a deformation of the deformable body, the support being electrically insulating, porous and being made of at least one support material including at least one refractory, optionally hydrated, ceramic compound.

20 Claims, 2 Drawing Sheets

(56)  References Cited

U.S. PATENT DOCUMENTS

| | | | |
|---|---|---|---|
| 5,375,474 A | 12/1994 | Moore, Sr. | |
| 9,933,321 B2 * | 4/2018 | Kieffer | G01L 1/18 |
| 2005/0115329 A1 | 6/2005 | Gregory et al. | |
| 2005/0160837 A1 | 7/2005 | Tellenbach et al. | |
| 2008/0264176 A1 | 10/2008 | Bertrand et al. | |
| 2009/0173162 A1 | 7/2009 | Gregory et al. | |
| 2018/0002815 A1 * | 1/2018 | McGee | C23C 8/80 |
| 2018/0149531 A1 * | 5/2018 | Atashbar | G01L 1/2287 |
| 2021/0262873 A1 * | 8/2021 | Zhu | G01L 1/2287 |

OTHER PUBLICATIONS

International Search Report issued Feb. 7, 2022 in PCT/EP2021/081780 filed on Nov. 16, 2021, 3 pages.

Maiwald et al., "INKtelligent printed strain gauges", Procedia Chemistry, Elsevier Amsterdam, NL, vol. 1, No. 1, Sep. 1, 2009, pp. 907-910, XP026799693.

Kayser et al., "High-temperature thin-film strain gauges", Sensors and Actuators A: Physical, Elsevier BV, NL, vol. 37-38, Jun. 1, 1993, pp. 328-332 , XP026576906.

Herrmann et al., "Nanoparticle films as sensitive strain gauges", Applied Physics Letters, vol. 91, 183105, Oct. 30, 2007, pp. 1-3 (4 pages).

Preliminary French Search Report issued Jul. 15, 2021 in French Application No. 2011737 filed on Nov. 16, 2020 (with Translation of Categories of Cited Documents), 4 pages.

* cited by examiner

INORGANIC STRAIN GAUGE

The present invention relates to the measurement of deformation by means of a contact strain gauge.

A contact strain gauge makes it possible to measure the deformation of a body in a given direction. For this purpose, it is in, generally adhesively bonded, contact with the body whose deformation it is sought to measure.

Figure 1:
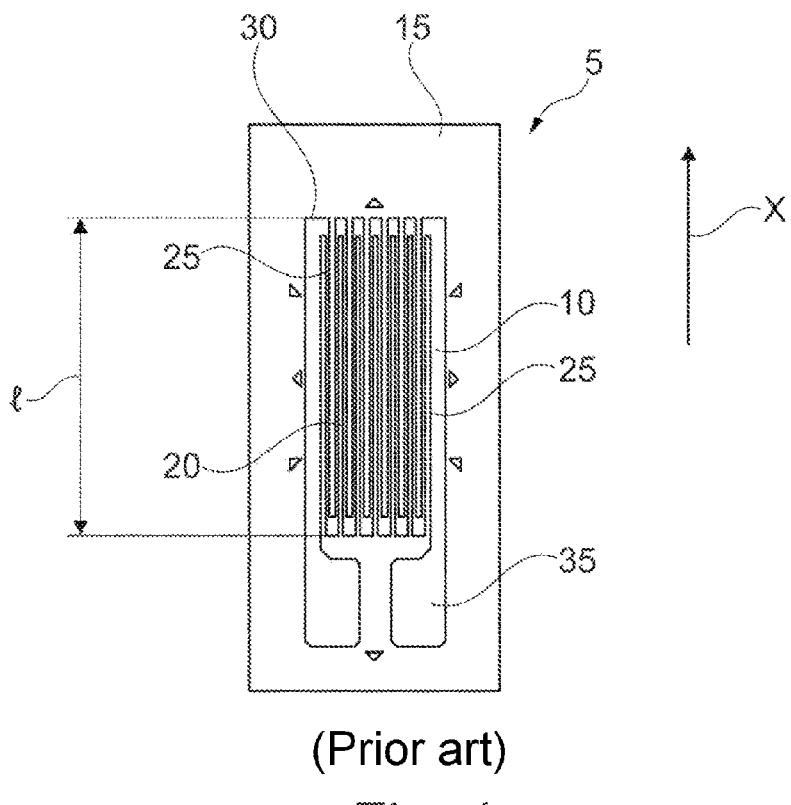

As is illustrated in FIG. 1, a contact strain gauge 5 conventionally consists of a metallic resistive member 10, in the form of a wire or a track, fastened to a thin and electrically insulating support 15. The resistive member has a serpentine shape 20. It is formed for the most part from rectilinear portions 25 extending parallel to one another and connected by connection portions 30. The ends of the serpentine shape are extended by connection pads 35 in order to connect the gauge to an instrument, for example by welding connection cables.

In order to measure the deformation of a deformable body $\varepsilon_{xx}$ in a direction X, the strain gauge is adhesively bonded to the body such that the rectilinear portions 25 are arranged parallel to the direction X.

During the deformation of the body, the rectilinear portions of length 1 elongate or retract, which is manifested by a variation in the resistance R of the wire.

The variation $\Delta R$ in the resistance is, in a first approximation, proportional to the elongation $\Delta l$ of each rectilinear portion according to equation (1)

[Math 1]

$$\frac{\Delta R}{R} = K\frac{\Delta l}{l} \quad (1)$$

In equation (1), K is a constant, denoted gauge factor, which depends on the material constituting the wire in question. K is, for example, 2 for a wire made of Constantan™ or nickel-chromium, and is 3.2 for a wire made of Elinvar.

Considering that the deformation of the wire is homologous to the deformation of the portion of the body to which the strain gauge is fastened, it is thus possible to determine the deformation $\varepsilon_{xx}$ of the body by measuring the relative variation in the resistance of the metal wire of the strain gauge, according to equation (2)

[Math 2]

$$\varepsilon_{xx} = \frac{1}{K}\frac{\Delta R}{R} \quad (2)$$

Thus, when the body has an elastic behavior, it is possible to determine the stress applied to the body along the axis X under the strain gauge.

The deformable body can in particular be a part of a mechanical sensor. It is then denoted test body. The measurement of the deformation of the test body thus makes it possible to indirectly determine a mechanical quantity such as a force, an acceleration, a pressure, the amplitude of a vibration, etc.

The support of a strain gauge is made of an electrically insulating material in order not to disturb the measurement of the variation in the resistance of the wire. Furthermore, it is sufficiently thin such that the deformation of the rectilinear portions is identical to the deformation of the portion of the body which it covers.

Generally, the support is made of a polymer material.

For example, a support with a thickness of about 20 μm to 30 μm can be obtained by using epoxy resins. High-precision strain gauges can thus be manufactured, but cannot be used at temperatures greater than 100° C. To widen the range of use temperatures of the gauges up to 350° C., gauge supports have been developed that are obtained by hot-rolling under pressure a mixture of epoxy and phenolic resins reinforced by glass fibers. The gauges thus obtained are able to measure deformations of 2.0% at the most.

Gauges equipped with polyimide supports are also known. Such supports are flexible and strong, the polyimides having limits of deformation at break of approximately 20% and up to 400° C. when they are reinforced with fillers. Gauges with a polyimide support are more particularly suited to deformation measurements from which a high degree of precision is not sought.

Various methods of manufacturing strain gauges with a support based on organic material are known.

For example, one of them utilizes the techniques, from the field of printed circuits, of photolithography and selective etching to obtain a so-called film strain gauge formed from an epoxy resin support having a thickness of between 20 and 30 microns and from a metal sheet having a thickness of 50 microns.

It is known to manufacture strain gauges by means of printing techniques. The deformation of the body on which the gauge is printed is, for example, determined from the variation in resistivity of a filler of metal particles in a polymer binder. The articles "*INKtellingent printed* strain *gauge*", M. Maiwald et al., Sensors and Actuators A, 162, pp. 198-201 (2010), and "*Nanoparticle films as sensitive* strain *gauges*", J. Herrmann et al., Appl. Phys. Lett., 91, 183105 (2007) describe examples of such printed gauges. However, the temperature use range of the printed gauges is limited. Furthermore, they require complex manufacturing apparatus whose receiving capacity is limited, which therefore limits the dimensions of the bodies which can be instrumented by means of a gauge.

There are few strain gauges capable of being brought into contact with a body that are able to measure the deformation of this body at a temperature greater than 400° C.

The article "*High temperature thin-films* strain *gauges*", P. Kayser et al., Sensors and Actuators A, 37-38, pp. 328-332 (1993), describes the formation, in contact with a turbine blade of an aircraft engine, of a strain gauge by depositing by cathode sputtering a layer of aluminum $Al_2O_3$ surmounted by a resistive layer made of an NiCr/PdCr alloy. Such a gauge is thus suitable for measuring deformations at an operating temperature of the blade of 900° C. However, the method described in Kayser et al. can be used only for bodies with a volume of less than 1 m³ which can be introduced into the vacuum chamber of a cathode sputtering device. It is, for example, not possible to instrument a structure, for example a bridge, or industrial equipment, for example a press weighing several tonnes by means of such a method. Furthermore, such a method cannot be used on any type of material constituting the body, and in particular not on materials which can degas and prevent a vacuum necessary for implementing cathode sputtering from being obtained.

There is therefore a need to overcome the disadvantages described above.

The invention proposes a device for measuring a deformation, the device comprising a deformable body and a strain gauge, the strain gauge comprising a support in contact with the deformable body and a metallic resistive member in contact with the support, the resistive member having a resistance which can vary with a deformation of the deformable body, the support being electrically insulating, porous and being made of at least one support material comprising at least one refractory, optionally hydrated, ceramic compound.

The device according to the invention makes it possible to measure a deformation of the deformable body at a temperature greater than 400° C., or greater than 700° C., or even greater than 1000° C.

Furthermore, as will become clearly apparent below, the strain gauge can be easily formed on the body, which can have a large size. In particular, it can be formed directly on site, without the need to repatriate the body to a workshop to deposit the gauge there.

The ceramic compound can represent more than 50% of the mass of the support material.

It can be chosen from $Al_2O_3$, AlN, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

The ceramic compound is preferably an oxide.

The support material can comprise, or be constituted by, a hydrated cement and/or a cured ceramic adhesive.

The support material can consist of a binding matrix and a filler formed of particles dispersed in the binding matrix. The binding matrix binds the particles to one another so as to confer cohesion on the support material.

The mass of the filler can represent at least 50% of the mass of the support material.

The filler can comprise, or consist of, at least one particulate fraction formed of particles made of at least one material chosen from $Al_2O_3$, AlN, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

It can comprise, or consist of, at least one particulate fraction formed of particles made of at least one oxide material chosen from $Al_2O_3$, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

The filler can comprise, or consist of, a plurality of particulate fractions, the particles of each particulate fraction being made of a material different than the material or materials constituting the or the other particulate fractions.

The binding matrix preferably comprises an inorganic binder for more than 90% of its mass, or for more than 95% of its mass, or for more than 99% of its mass.

The inorganic binder can be a hydrated hydraulic binder.

The inorganic binder can comprise at least one compound chosen from sodium silicate, lime, alumina silicate, calcium silicate, calcium aluminate, a clay, in particular a silicon clay, fly ash which can be activated in particular by alkaline materials, and mixtures thereof.

Moreover, the binding matrix can comprise an organic binder for less than 5%, or for less than 1%, of its mass. In particular, the binding matrix can be free of organic compounds. By organic compound is to be understood any compound whose chemical formula comprises at least carbon and hydrogen atoms.

The support material can be sintered.

The support material is electrically insulating, that is to say that it has a volume resistivity greater than $10^{14}$ Ω·cm and a breakdown voltage, measured in alternating current, greater than 6000 V.

The support has a porosity preferably between 10% and 40%, in order to confer good mechanical strength on the support.

The porosity of the support can be determined in the following way. First of all, the support is infiltrated with a resin. A slice of the thus infiltrated support is cut and then polished in order to obtain a good surface state. The polishing is carried out at the minimum with a 1200 grade paper, preferably with a diamond paste. Images are produced by means of a scanning electron microscope (SEM), preferably in a mode using back-scattered electrons that confers a high contrast between the support material and the resin. Each image has at the minimum 1024×768 pixels. The magnification used is such that the width of the image is between 50 times and 100 times the average size of the pores, in particular so as to take into account the pores of a size of between 10 nm and 10 μm. A first image can be produced by means of a visual estimation of the average size of the pores. The area occupied by the pores is determined by analysis of the images according to the erosion/expansion method implemented in image analysis software such as ImageJ (https://imagej.nih.gov/ij/). The porosity is determined by summing the area occupied by all of the pores on the images on the sum of the total areas of each image.

The support can be a single-layer or multilayer support.

The support can comprise a plurality of support materials. For example, the support is a multilayer support, each layer of the support being a different support material.

The support preferably has a thickness of at least forty times less than the thickness of the deformable body. Good mechanical coupling between the strain gauge and the deformable body is thus ensured. The thickness of the deformable body is measured under the support in a direction normal to the support.

The thickness of the support is between 0.05 mm and 5.00 mm. It can be chosen according to the characteristics of the resistive member in order to ensure optimal electrical insulation between the deformable body and the resistive member.

The support preferably has a thin shape. For example, the ratio of the length to the thickness of the plate is at least 10, preferably at least 100.

The support can be planar or curved.

The resistive member can comprise a plurality of rectilinear portions connected in pairs by connection portions so as to have a serpentine shape. The connection portions can be straight or curved.

It can comprise between 1 and 500 rectilinear portions.

The rectilinear portions can each have a length of between 0.3 mm and 150 mm.

In a variant, the resistive member can be a track formed on the support, which can be formed by depositing a resistive paste or by spraying a powder of metallic particles.

The resistive member can be a cured ceramic adhesive. It can be a hydrated cement filled with a metal, preferably chosen from Ni, Ag and a mixture thereof.

The thickness of the track can be between 0.025 mm and 1 mm. The width of the track can be between 0.025 mm and 15 mm. The distance between two adjacent rectilinear portions can be between 0.025 mm and 15 mm. It is measured in the plane of the support along an axis perpendicular to the axis of extension of one of the rectilinear portions.

The resistive member can be a wire. The wire can have a diameter of between 0.025 mm and 1.0 mm. The wire can be deposited before curing of the support material. Preferably, the wire is coated, preferably over the whole of its lateral face, in the support material.

The resistive member can have a varied cross section, for example a circular, rectangular or square cross section. The area of the cross section can be between 0.0005 and 15 mm$^2$.

The resistance of the resistive member can be between 50Ω and 2000Ω, preferably 120Ω or 350Ω. A high-resistance resistive member makes it possible to increase the precision of the deformation measurement, according to equation (1).

The resistive member can comprise, for more than 40% of its mass, at least one metal chosen from copper, aluminum, gold, silver, titanium, palladium, nickel, iron, platinum, titanium, tin and alloys thereof. In particular, the resistive member can comprise, for more than 40% of its mass, at least one metal chosen from silver, nickel and a mixture thereof.

In particular, the resistive member can be an alloy chosen from:

Constantan™ comprising, in percentages by mass, 55% of nickel and 45% of copper, Karma™ comprising, in percentages by mass, 74% of nickel, 20% of chromium, 3% of aluminum and 3% of iron, Isoelastic™, comprising, in percentages by mass, 36% of nickel, 8% of chromium, 0.5% of molybdenum and 55.5% of iron, Nichrome V™, comprising, in percentages by mass, 80% of nickel and 20% of chromium, an alloy comprising, in percentages by mass, 92% of platinum and 8% of tungsten, and Armour™, comprising, in percentages by mass, 70% of iron, 20% of chromium and 10% of aluminum.

Moreover, the strain gauge can comprise connection pads, in contact with the support and with the resistive member, in order to bring the strain gauge into contact with a measuring instrument for measuring the variation in resistance during the deformation of the body. The connection pads can be tinned. The connection pads can be formed of the same material as the resistive member. A cable connecting the measuring instrument to the strain gauge can be welded to one of the connection pads.

The deformable body can be metallic, or made of a cementitious material, or of a ceramic, or of glass, or of a plastic, in particular a thermoplastic, or of composite, in particular an epoxy-glass fiber composite.

The volume of the deformable body can be greater than 1 m$^3$, or greater than 5 m$^3$.

The deformable body can be a structure or a part of a structure, for example a civil engineering structure, a deformation of which it is desired to measure.

The portion of the deformable body on which the support is in contact can be planar or curved. For example, it has a cylindrical shape of revolution or a spherical shape.

The device according to the invention can be a sensor for measuring a mechanical quantity, for example a pressure or a deformation, comprising a test body comprising the deformable body. A sensor is such that the measurement of a deformation of the test body makes it possible to deduce the value of the mechanical quantity.

The deformable body is, for example, a thermoforming mold. The measurement of the deformation of the deformable body can make it possible to determine the pressure within the thermoforming mold, in particular at the molding surface.

According to another example, the deformable body is a filling channel of a plastic injection mold. The measurement of the deformation of the deformable body can make it possible to determine the vibration amplitude of the channel and thus to monitor the propagation of the polymerization front of the plastics material injected into the mold.

According to yet another example, the deformable body is a cast part, for example a pump body. The measurement of the deformation of the deformable body can make it possible to determine the vibration amplitude of the deformable body in order, for example, to carry out preventive maintenance of the deformable body when the amplitude exceeds a nominal value.

According to yet another example, the deformable body is a prosthesis, for example made of titanium. The measurement of the deformation can make it possible to determine the intensity of forces applied to the prosthesis.

Moreover, the invention relates to a method for measuring a deformation, comprising:

providing a device according to the invention, heating the deformable body to a temperature greater than 400° C., or greater than 500° C., or greater than 700° C., or greater than 1000° C., and measuring the deformation of the body by means of the strain gauge.

The invention finally relates to a method for manufacturing a device for measuring a deformation, comprising the steps of:

a) forming at least one layer by depositing a composition on a deformable body, b) curing the layer so as to form a support, c) depositing a resistive member in contact with the support, such that the device is in accordance with the invention.

The composition can be a cement paste or be a ceramic adhesive. A cement paste comprises a hydraulic binder, for example silica and/or lime, and water. A ceramic paste comprises particles of at least one refractory ceramic in a binder. The refractory ceramic particles can be dispersed in the solvent.

The binder can comprise:

an inorganic compound, in particular chosen from a clay, lime, sodium silicate and mixtures thereof and/or an organic compound, in particular chosen from tar, a bitumen, a pitch, an in particular modified starch, a lignosulfonate, molasses, cellulose, a derivative of cellulose, polyvinyl alcohol, polybutadiene and mixtures thereof.

The composition can comprise, for at least 50% of its mass, at least one material chosen from $Al_2O_3$, AlN, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

In particular, it can comprise, for at least 50% of its mass, aluminum or zircon or zirconia. The composition can thus be qualified as being refractory.

For example, the composition is chosen from an alumina adhesive ALUCEM-HT™ 2, an adhesive based on alumina JYALUCEM™ 20, an adhesive based on zircon ZIRCOCEM™ 1 or ZIRCOMCEM™ 5/5F or an adhesive based on zirconia ZIRCOCEM™ 9, marketed by Anderman.

The paste can have a viscosity, measured by means of a vortex or Couette viscometer, which is between 1000 cps and 100 000 cps.

In step a), the composition can be coated on the support.

The coating of the composition can be carried out by means of a brush, a syringe or preferably by means of a printing device, preferably a 3D printing device.

The 3D printing device can comprise a robot comprising a base and an articulated arm movable with respect to the base. The base can be fastened to a frame or it can be mounted on a transport vehicle. The printing device can comprise a printing nozzle borne by the articulated arm, through which nozzle a bead of the composition can be extruded and deposited in the form of the layer on the support.

The bead can be deposited in multiple passes of the printing nozzle on the support in order to form the layer. Such deposition in several layers makes it possible to optimize drying and to facilitate removal of the binder.

The method can comprise the smoothing of the layer in order for the layer to have a predetermined thickness. The smoothing can comprise the movement of a smoothing tool on a face of the layer. The smoothing tool is, for example, a squeegee or a brush.

In step b), the curing can result from the setting of the hydraulic binder contained in the cement paste.

The curing can result from the evaporation of the solvent contained in the adhesive. The constituent or constituents of the binder can additionally react with the materials constituting the refractory ceramic particles to bind the particles to one another.

The curing can be obtained by sintering the composition.

The method can comprise the heating of the layer formed in step a), in order to accelerate the curing of the layer. The heating can be carried out until the temperature of the layer is at least 50° C.

The heating can be carried out by blowing hot air onto the layer and/or by illuminating the layer with infrared radiation and/or by forced convection of an air flow at an ambient temperature.

At the end of step b), the layer is considered to be cured as soon as the Young's modulus of the support material is greater than or equal to 80% of the value of the Young's modulus of the support material measured after 24 hours of curing.

In step c), the method preferably comprises printing the resistive member on the support. The printing of the resistive member can be carried out by a technique chosen from screen printing or extrusion of a metallic ink or of a metallic paste, and inkjet printing of a metallic ink.

In a variant, the resistive member can be printed by an additive manufacturing technique, in particular comprising the spraying of metallic particles onto the support, the speeds of the particles being supersonic. Such a technique is referred to as "cold spray".

Figure 2:
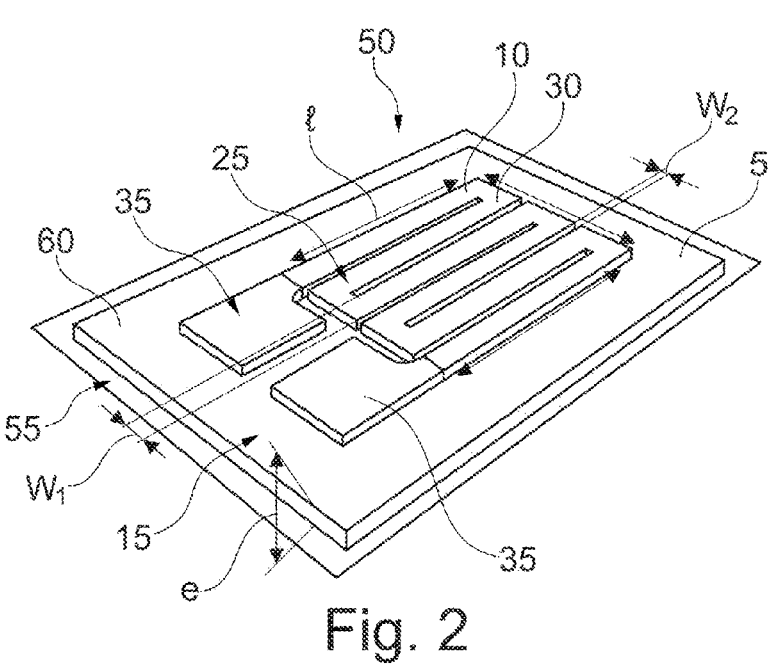
Figure 3:
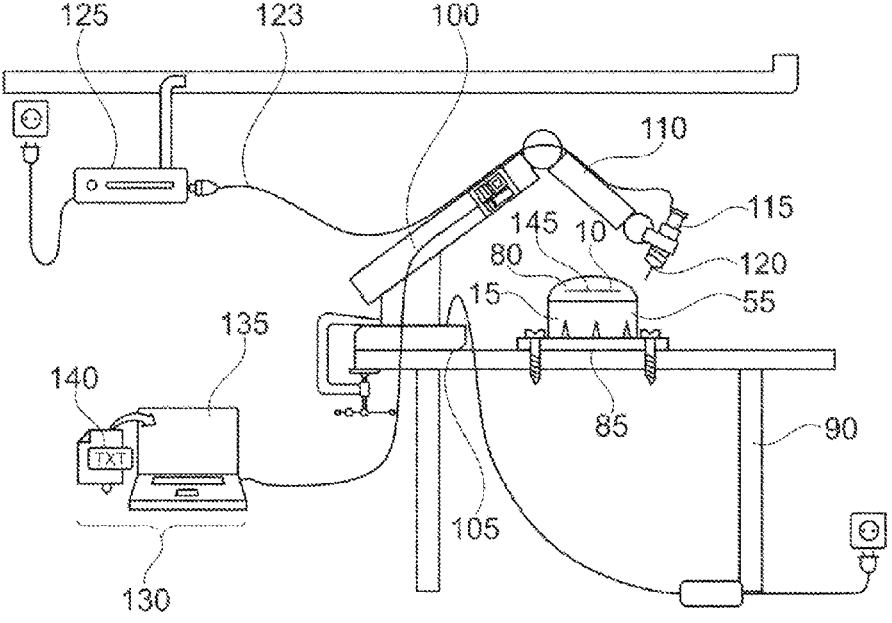

The invention may be better understood on reading the following detailed description of nonlimiting exemplary embodiments thereof and from examining the appended drawing, in which:

FIG. 1 schematically shows, in a front view, a strain gauge of the prior art,

FIG. 2 schematically shows, in a perspective view, an exemplary embodiment of a device according to the invention, and FIG. 3 shows an example of implementing the manufacturing method according to the invention.

The relative proportions of the elements illustrated in the appended drawing have not always been observed for the sake of clarity of the drawing.

FIG. 2 shows an example of a device 50 according to the invention. The device comprises a deformable body 55 and a strain gauge 5 in contact with the deformable body.

The strain gauge comprises a support 15 in contact with the deformable body, and a resistive member 10.

The resistive member 10 is in contact with the face 60 of the support opposite to the deformable body 55.

The resistive member is a track, which has a serpentine shape. It has rectilinear portions 25 of length 1, for example equal to 10 mm. In the example illustrated, it comprises six rectilinear portions, but this number is not limiting.

The rectilinear portions have a thickness $W_1$ which can be equal to 0.5 mm. The adjacent portions are separated by a distance $W_2$, for example equal to 0.1 mm.

The rectilinear portions are connected to one another in pairs by connection portions 30.

The strain gauge comprises connection pads 35 arranged on the face 60 of the support bearing the resistive member. The connection pads 35 are in electrical contact with the resistive member 10.

The support is thin, for example having a thickness e of 50 μm. It has a porosity greater than 10%. It is, for example, made of a cured ceramic adhesive or of a hydrated ceramic cement.

FIG. 3 shows an example of implementing the method for manufacturing the device according to the invention.

A deformable body 55 having a hemispherical portion 80 is mounted on a clamping member 85 screwed to a clamping table 95.

A robot 100 comprising a base 105 and an articulated arm 110 mounted on the base is fastened to the clamping table. It further comprises a syringe 115 comprising an application nozzle 120 for depositing a composition on the deformable body. The application nozzle is supplied, via a supply tube 123, by a dispenser 125 containing the composition.

The robot is controlled by a control unit 130 which comprises a computer 135 having a memory in which there is loaded a program 140 comprising instructions for controlling the robot and a processor for executing the instructions.

A 3D model comprising the geometry of the deformable body and the geometry of the strain gauge is defined which is interpreted by the program in order to determine the various paths of the articulated arm of the robot and the opening and closing operations of the supply nozzle. The 3D model is loaded in the memory of the computer.

In a first step, the dispenser is loaded with a composition based on at least one refractory ceramic, and the articulated arm is moved along the hemispherical face 145 of the deformable body along one of the paths, and the composition is deposited in order to form a layer. The layer is then cured to form a support 15.

In a second step, a metallic paste is introduced into the dispenser instead of the ceramic composition. The articulated arm is then moved along the support along another of the paths, and the metallic paste is deposited through the application nozzle on the support 15 in order to form a resistive member 10.

The invention is, however, not limited to the examples, embodiments and modes of implementation described above.

The invention claimed is:

1. A device for measuring a deformation, the device comprising:
   a deformable body; and
   a strain gauge, the strain gauge comprising a support in contact with the deformable body and a metallic resistive member in contact with the support,
   wherein the resistive member has a resistance which can vary with a deformation of the deformable body, and
   wherein the support is electrically insulating, porous and made of at least one support material comprising at least one refractory ceramic compound, the ceramic compound comprising a hydrated cement and/or a cured ceramic adhesive.

2. The device as claimed in claim 1, wherein a porosity of the support is between 10% and 40%.

3. The device as claimed in claim 1, the support material being constituted by a hydrated cement and/or a cured ceramic adhesive.

4. The device as claimed in claim 1, the ceramic compound representing more than 50% of a mass of the support material.

5. The device as claimed in claim 4, the ceramic compound being chosen from $Al_2O_3$, AlN, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

6. The device as claimed in claim 1, the ceramic compound being an oxide.

7. The device as claimed in claim 1, wherein a thickness of the support is between 0.025 mm and 5.00 mm.

8. The device as claimed in claim 1, the resistive member being a hydrated cement filled with a metal.

9. The device as claimed in claim 1, the support being a single-layer support.

10. A method for manufacturing a device for measuring a deformation as claimed in claim 1, the method comprising:

a) forming at least one layer by depositing a composition on a deformable body;

b) curing the at least one layer so as to form a support; and c) depositing a resistive member in contact with the support.

11. The method as claimed in claim 10, the composition being a cement paste or a ceramic adhesive.

12. The method as claimed in claim 10, the composition being coated, in step a), on the deformable body.

13. The method as claimed in claim 10, comprising the printing of the resistive member on the support.

14. The method as claimed in claim 13, the printing being carried out by a technique chosen from screen printing or extrusion of a metallic ink or of a metallic paste, and inkjet printing of a metallic ink.

15. The method as claimed in claim 13, the resistive member being printed by an additive manufacturing technique.

16. A method for measuring a deformation, comprising:

providing a device as claimed in claim 1, heating the deformable body to a temperature greater than 400° C., and measuring the deformation of the body with the strain gauge.

17. A device for measuring a deformation, the device comprising:

a deformable body; and a strain gauge, the strain gauge comprising a support in contact with the deformable body and a metallic resistive member in contact with the support, wherein the resistive member has a resistance which can vary with a deformation of the deformable body, wherein the support is electrically insulating, porous and made of at least one support material comprising at least one refractory ceramic compound, and wherein the resistive member is a hydrated cement filled with a metal.

18. The device as claimed in claim 17, wherein a porosity of the support is between 10% and 40%.

19. The device as claimed in claim 17, the ceramic compound representing more than 50% of a mass of the support material.

20. The device as claimed in claim 19, the ceramic compound being chosen from $Al_2O_3$, AlN, $SiO_2$, MgO, a mica, SiC, $ZrO_2$, $ZrSiO_2$, CaO, $Cu_2O$, CuO, $Y_2O_3$, indium-tin oxide, $TiO_2$ and mixtures thereof.

* * * * *